United States Patent
Diaz et al.

(10) Patent No.: US 10,550,541 B1
(45) Date of Patent: Feb. 4, 2020

(54) CONNECTION SYSTEM FOR CONNECTING AN IMPLEMENT TO A WORK VEHICLE

(71) Applicant: Deere & Company, Moline, IL (US)

(72) Inventors: Jose Angel Diaz, Monterrey (MX); Jesus Armando Montalvo Urbina, Guadalupe (MX)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/394,999

(22) Filed: Apr. 25, 2019

(51) Int. Cl.
*E02F 3/36* (2006.01)
*B62D 49/06* (2006.01)
*E02F 3/34* (2006.01)

(52) U.S. Cl.
CPC .......... *E02F 3/3627* (2013.01); *B62D 49/065* (2013.01); *E02F 3/34* (2013.01); *E02F 3/3659* (2013.01)

(58) Field of Classification Search
CPC ..... E02F 3/3627; E02F 3/3631; E02F 3/3636; E02F 3/3659; B62D 49/065
See application file for complete search history.

(56) References Cited

U.S. PATENT DOCUMENTS

| | | | |
|---|---|---|---|
| 3,154,162 A * | 10/1964 | McCaleb | B62D 49/00 |
| | | | 180/21 |
| 4,780,046 A | 10/1988 | Friesen et al. | |
| 5,064,339 A | 11/1991 | Ahlers | |
| 5,141,385 A | 8/1992 | Tibbatts et al. | |
| 5,147,173 A * | 9/1992 | Fauber | E02F 3/3627 |
| | | | 172/273 |
| 5,685,689 A | 11/1997 | Schneider et al. | |
| 5,915,837 A * | 6/1999 | Brown | E02F 3/3627 |
| | | | 37/468 |
| 6,301,811 B1 * | 10/2001 | Gilmore, Jr. | E02F 3/3622 |
| | | | 37/468 |
| 6,422,805 B1 | 7/2002 | Miller | |
| 6,519,923 B1 | 2/2003 | Cooksey et al. | |
| 7,160,076 B2 | 1/2007 | Curl et al. | |

(Continued)

FOREIGN PATENT DOCUMENTS

| | | |
|---|---|---|
| DE | 1156023 B | 10/1963 |
| DE | 1291284 B | 3/1969 |

(Continued)

OTHER PUBLICATIONS

Extended European Search Report for Application No. EP16190932.0 dated Feb. 23, 2017 (8 pages).

(Continued)

*Primary Examiner* — Gerald McClain
(74) *Attorney, Agent, or Firm* — Michael Best & Friedrich LLP (57) ABSTRACT

A connection system for connecting an implement to a work vehicle has a movable arm and an operator control area. The connection system includes a lock assembly and a control switch. The lock assembly is able to be coupled to the movable arm. The lock assembly includes a pin and an electrically operated actuator. The pin is able to engage a portion of the implement. The actuator is coupled to the pin for translating the pin. The control switch is positioned for engagement from within the operator control area. The control switch is able to be in selective electrical communication with the actuator.

18 Claims, 7 Drawing Sheets

(56) References Cited

U.S. PATENT DOCUMENTS

| | | | |
|---|---|---|---|
| 8,376,388 B2 | 2/2013 | Graber et al. | |
| 10,294,629 B1* | 5/2019 | Sivaraman | E02F 3/3631 |
| 2006/0210384 A1* | 9/2006 | Warren | E02F 3/3659 |
| | | | 414/723 |
| 2010/0183417 A1* | 7/2010 | Martin | E02F 3/3627 |
| | | | 414/723 |
| 2017/0089029 A1* | 3/2017 | Esqueda | E02F 3/34 |
| 2018/0375256 A1* | 12/2018 | Peterson | H01R 13/631 |

FOREIGN PATENT DOCUMENTS

| | | | |
|---|---|---|---|
| GB | 1474862 A | 5/1977 | |
| GB | 1475202 A | 6/1977 | |

OTHER PUBLICATIONS

Glassmaster Controls, "Cable Latch Systems," brochure <http://www.gcontrols.com/products/cable_latches_latch_products/Cable_Latch_Systems_Glassmaster_Controls.pdf>, Dec. 22, 2004 (4 pages).

* cited by examiner

CONNECTION SYSTEM FOR CONNECTING AN IMPLEMENT TO A WORK VEHICLE

BACKGROUND

The present disclosure relates to a connection system that locks an implement to a movable arm of a work vehicle.

Mechanically controlled systems for attaching and detaching an implement from a loader use a flexible sheathed cable assembly to actuate a pin. An issue with such mechanically controlled systems is they rely on a user's strength to adequately pull on a knob or lever to actuate the pin. The longer the flexible sheathed cable and the more turns the flexible sheathed cable must make to reach the location of the pin, the harder the user must pull on the knob or lever to transfer an adequate amount of force to the pin. For particularly large vehicles, then, the issue of loss of force over distance and/or turns makes such a mechanically controlled system impractical.

What is needed, therefore, is a system that allows a user to relatively effortlessly actuate a connection system regardless of the size of the work vehicle.

SUMMARY

A work vehicle, e.g., a tractor, is often configured for selective attachment to a number of hydraulically actuated attachment implements. These independent attachment implements may take the form of, for example, a bucket, a hay bale fork, a grapple, a blade, or the like in order to perform a specific task desired by the operator of the work vehicle. As part of the attachment/detachment process, a locking mechanism is manipulated by the operator to secure or unsecure the attachment implement to the tractor.

In one aspect, the disclosure provides a connection system for connecting an implement to a work vehicle having a movable arm and an operator control area. The connection system includes a lock assembly and a control switch. The lock assembly is able to be coupled to the movable arm. The lock assembly includes a pin and an electrically operated actuator. The pin is able to engage a portion of the implement. The actuator is coupled to the pin for translating the pin. The control switch is positioned for engagement from within the operator control area. The control switch is able to be in selective electrical communication with the actuator.

In another aspect, the disclosure provides a work vehicle to removably couple an implement thereto. The work vehicle includes a frame, a power source, a seat, an arm, an implement attachment bracket, a lock assembly, and a switch. The power source and seat are each coupled to the frame. The arm is movable relative to the seat and includes a proximal end coupled to the frame. The implement attachment bracket is coupled to a distal end of the arm. The implement attachment bracket is able to removably receive a portion of the implement. The lock assembly is coupled to the implement attachment bracket. The lock assembly includes a pin and an electrically operated actuator. The pin is able to engage the portion of the implement. The actuator is for translating the pin. The switch is accessible from the seat and able to selectively place the actuator in electrical communication with the power source.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
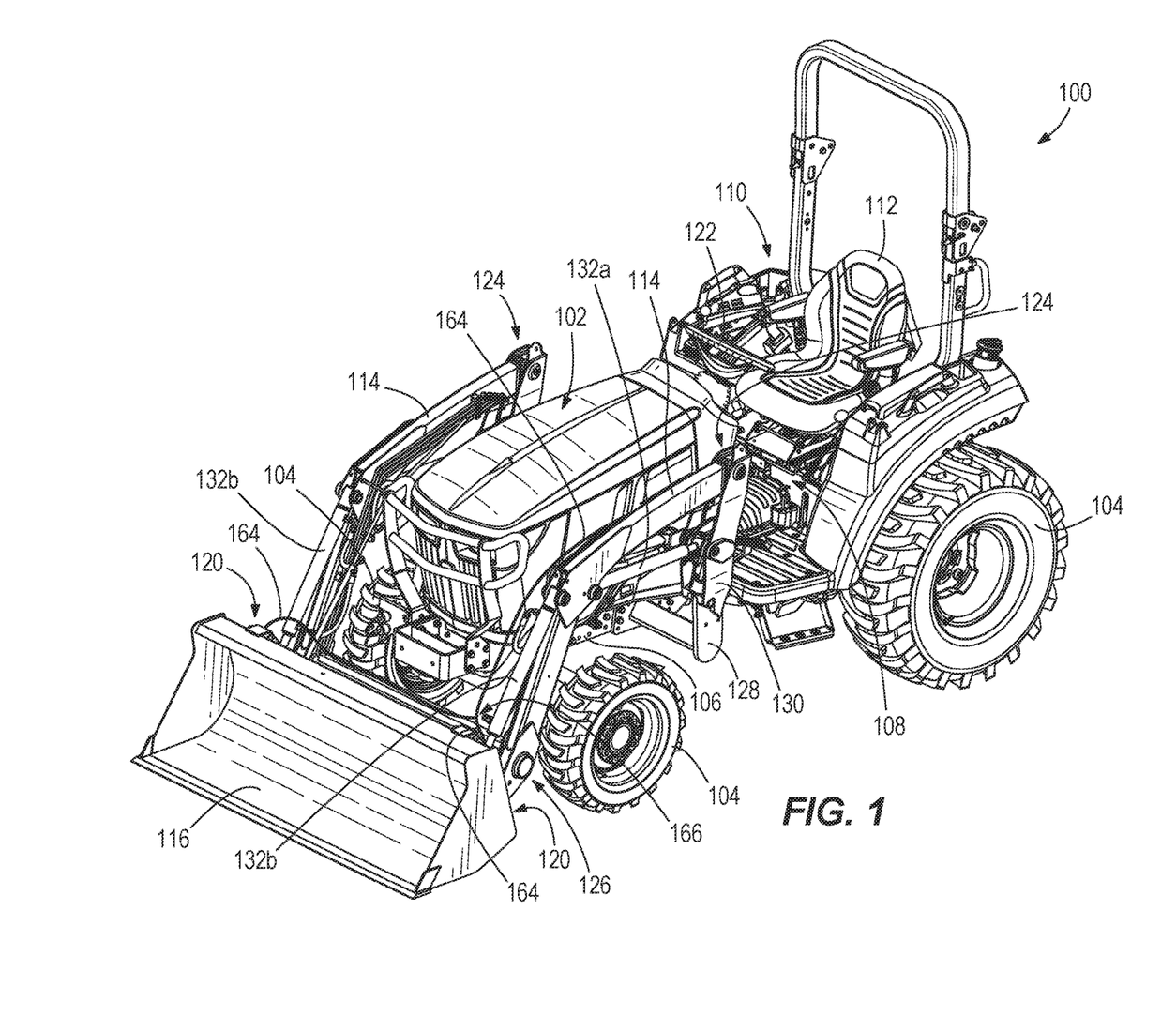
FIG. 1 is a front perspective view of a work vehicle with an implement in the form of a bucket attached thereto via a connection system according to an embodiment of the disclosure.
Figure 2:
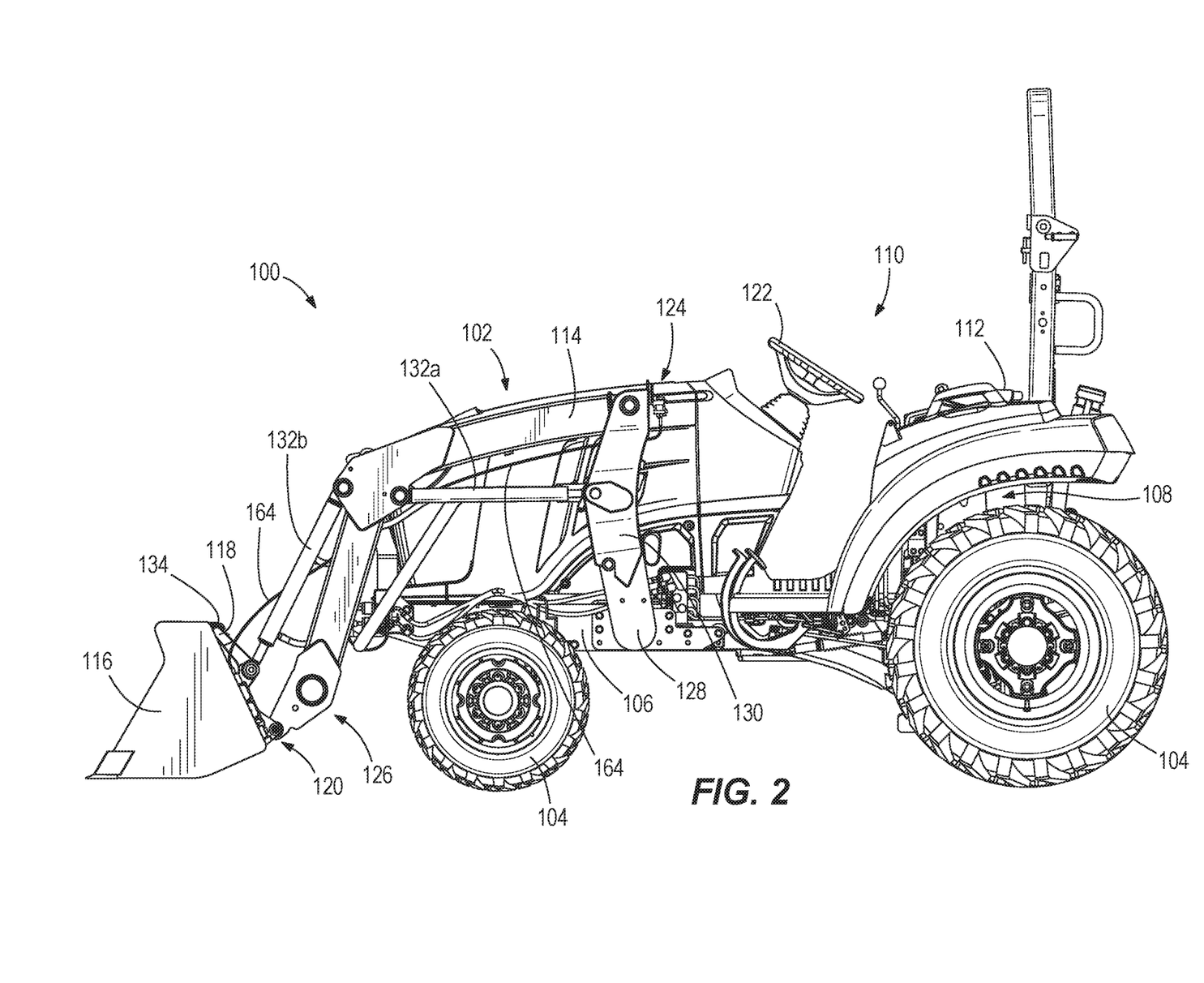
FIG. 2 is a side elevation view of the work vehicle, implement, and connection system of FIG. 1.
Figure 3:
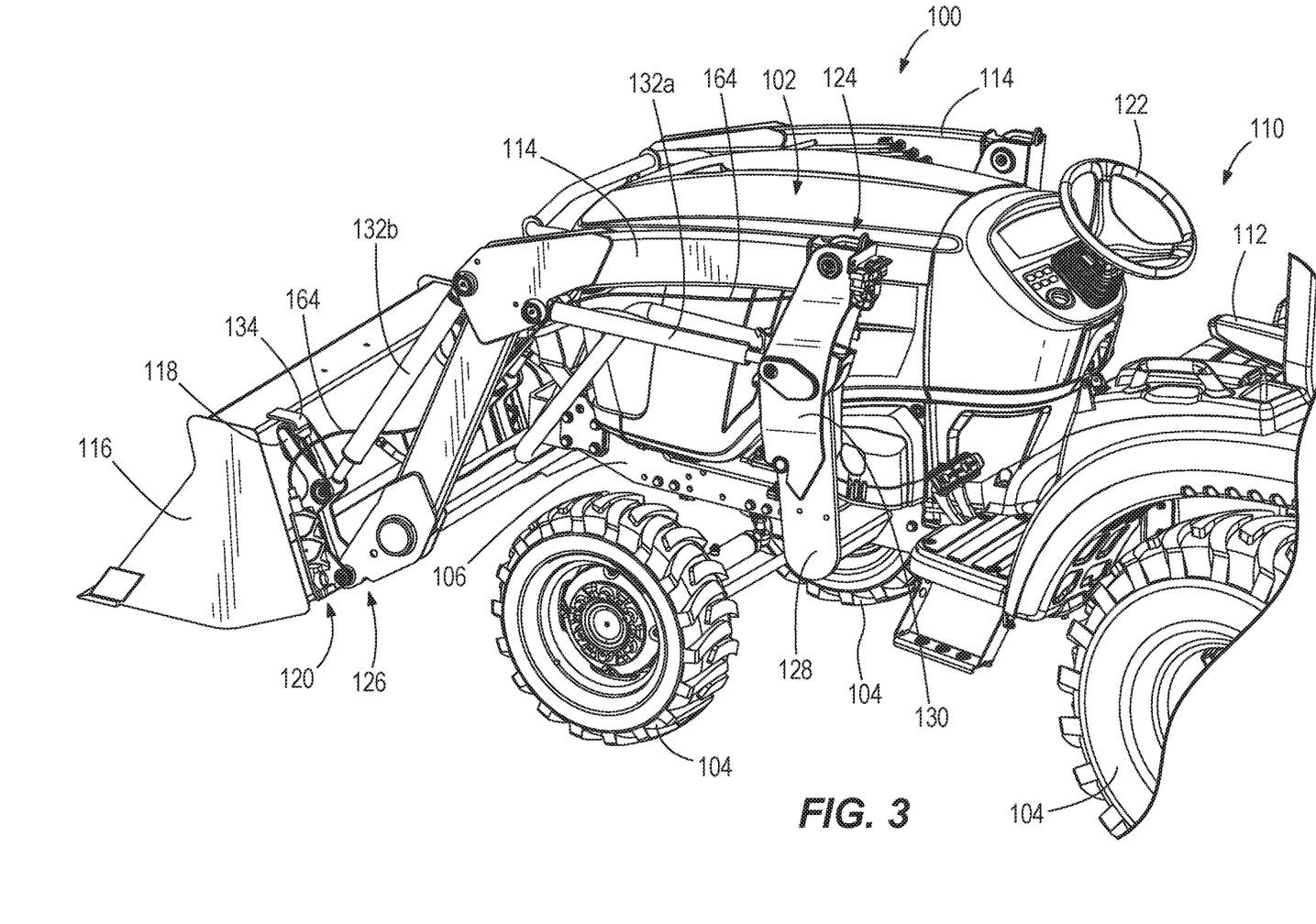
FIG. 3 is a partial rear perspective view of the work vehicle, implement, and connection system of FIG. 1.

FIGS. 1-3 illustrate an embodiment of a work vehicle 100. The work vehicle 100 is illustrated as a tractor; however, the work vehicle 100 may be, for example, a skid steer, a riding lawn mower, a backhoe, or other vehicle. A prime mover 102 supplies torque through a transmission (not shown) to at least one of a plurality of wheels 104 to move the work vehicle 100. Two of the wheels 104 may be powered by the prime mover 102 or all four wheels 104 may be powered by the prime mover 102. In other embodiments, the work vehicle 100 may include more than four wheels 104 with the prime mover 102 supplying torque to some or all of the wheels 104. In further embodiments, the wheels 104 may be replaced or modified with a continuous track. The prime mover 102 may include any rotational driveline power supply, for example, an internal combustion engine, a hydraulic motor, a hydrostatic system, an electric motor, and the like.

The work vehicle 100 includes a frame 106, a power source 108, an operator control area 110 including a seat 112, a movable arm 114 (e.g., a loader boom), an implement (e.g., a bucket) 116, an implement attachment member (such as an implement attachment bracket) 118, and a connection system 120.

The power source 108 (e.g., a battery) is coupled to the frame 106 in a position under the seat 112, for instance. The seat 112 is also coupled to the frame 106 in a rigid or an adjustable manner.

The operator control area 110 provides an operator control of the work vehicle 100. The illustrated operator control area 110 includes the seat 112, a steering wheel 122, and a plurality of controls. The operator is generally positioned in the seat 112 while steering the work vehicle 100 via the steering wheel 122 and operating the plurality of controls. In other embodiments, the steering wheel 122 may be replaced by a plurality of levers to control the direction of movement of the work vehicle 100 through the prime mover 102 and/or the transmission. The plurality of controls are also coupled to other components on the work vehicle 100, e.g., a hydraulic system, an auxiliary drive shaft, etc. and may be in the form of electrical switches, mechanical actuators, or a combination thereof.

The arm 114 is movable relative to the seat 112 and the frame 106 and includes a proximal end 124 and a distal end 126. The proximal end 124 of the arm 114 is coupled to the frame 106. In the illustrated embodiment, a fixed member 128 is attached to the frame 106 on a side of the work vehicle 100. The fixed member 128 is also detachably coupled to a detachable member 130. The detachable member 130 is coupled to the proximal end 124 of the arm 114. In the illustrated embodiment, the fixed member 128 and the detachable member 130 are located between the wheels 104 (e.g., front and back wheels) and adjacent the operator control area 110. In particular, an operator positioned in the seat 112 of the operator control area 110 can, during operation of the work vehicle 100, contact a portion of the detachable member 130. In other embodiments, the fixed member 128 and the detachable member 130 may be one integral member fixedly attached to the work vehicle 100.

The arm 114 is movable by actuation of a hydraulic cylinder assembly 132a coupled thereto. In the illustrated embodiment, two arms 114 are shown working in tandem to move the implement 116. In some embodiments, the two arms 114 may be a single integral component extending between both sides of the work vehicle 100.

Figure 4:
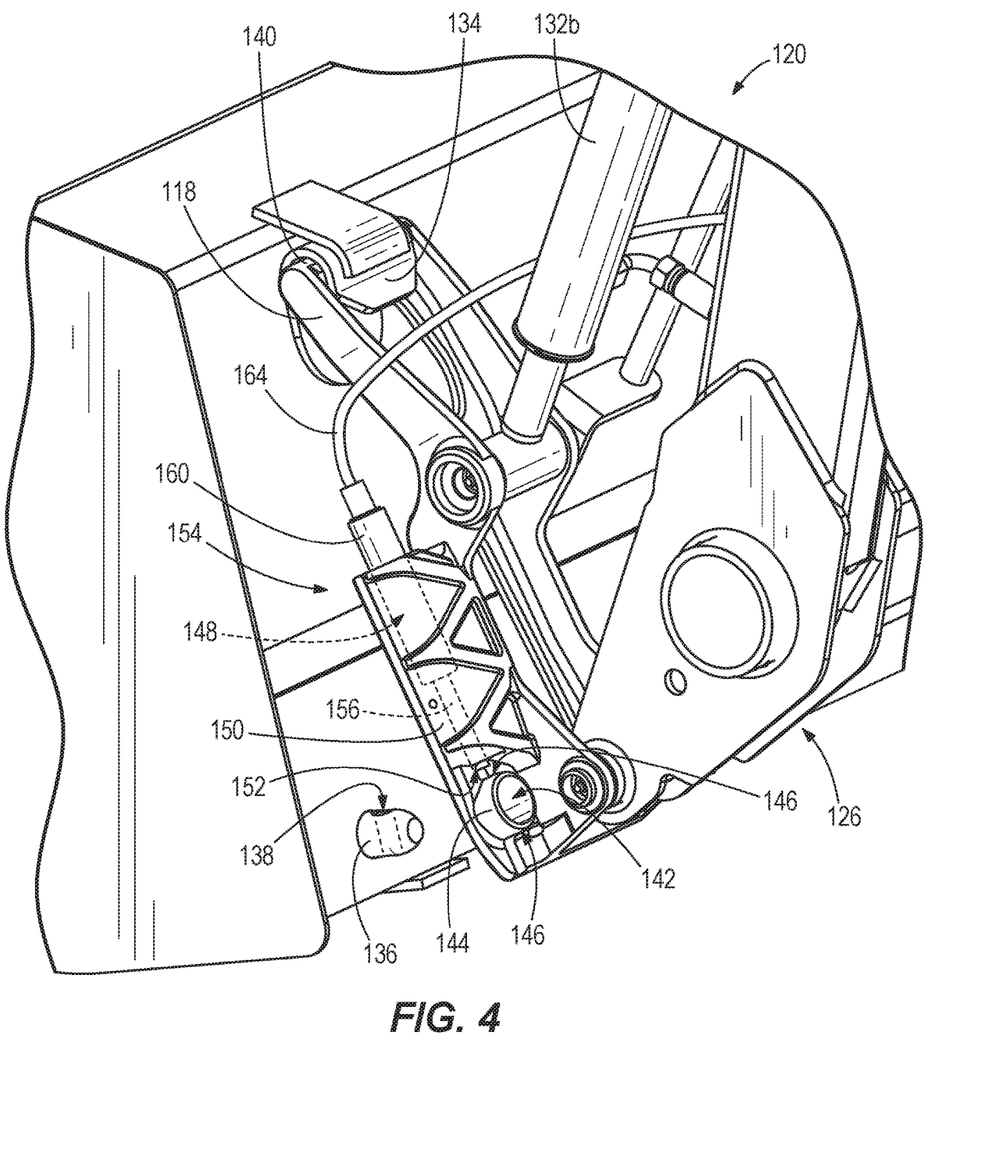
FIG. 4 is a detailed perspective view of a movable arm, an implement attachment member, the connection system, and the implement of FIG. 3 illustrating the implement attachment member partially engaged with the implement.

The implement 116 is illustrated as a bucket. In other embodiments, however, the implement 116 may be a sweep cleaner, hay bale fork, hay bale hugger, grapple, scraper, pallet fork, debris blower, blade, snow pusher, or the like for performing a specific task. With reference to FIGS. 3 and 4, a hook 134 is affixed to the implement 116. In addition, as shown in FIG. 4, a protrusion 136 extends from implement 116. In the illustrated embodiment, both the hook 134 and the protrusion 136 extend rearwardly from the implement 116. The protrusion 136 includes an aperture 138 extending therethrough. The implement 116 may include only one protrusion 136. In other embodiments, a protrusion 136 on each side of the implement 116 may be employed.

The implement attachment bracket 118 is coupled to the distal end 126 of the arm 114. In the illustrated embodiment, the implement attachment bracket 118 is pivotable relative to the arm 114 by actuation of a hydraulic cylinder assembly 132b. The implement attachment bracket 118 is made to removably receive a portion of the implement 116. As shown in the illustrated embodiment, the implement attachment bracket 118 includes a bar 140 for engagement with the hook 134 of the implement 116. A user may initially engage the implement 116 to connect the implement 116 to the arm 114 by engaging the hook 134 of the implement 116 with the bar 140 of the implement attachment bracket 118. In this manner, the user need not exit the operator control area 110 to begin attaching the implement 116 to the arm 114.

Also shown in the illustrated embodiment in FIG. 4, the implement attachment bracket 118 further includes a hole 142 defined therein to removably receive the protrusion 136 of the implement 116. In the illustrated embodiment, the implement attachment bracket 118 further includes a cylindrical projection 144 surrounding and further defining the hole 142. The cylindrical projection 144 includes two aligned openings 146 defined therein. In the illustrated embodiment, the openings 146 are diametrically opposed from each other. When the protrusion 136 of the implement 116 is fully received in the hole 142, the cylindrical projection 144 laterally surrounds the protrusion 136 and the aperture 138 of the protrusion aligns with the two openings 146 of the cylindrical projection 144.

The illustrated embodiment also includes an elongated passage 148 defined in the implement attachment bracket 118. The elongated passage 148 is defined in a sleeve 150 of the implement attachment bracket 118. The elongated passage 148, as illustrated, is a cylindrical passage defined in the sleeve 150. The elongated passage 148 extends orthogonally to the hole 142 of the implement attachment bracket 118. The illustrated embodiment further includes a port 152 defined in the implement attachment bracket 118. The port 152 is in communication with the elongated passage 148.

Figure 5:
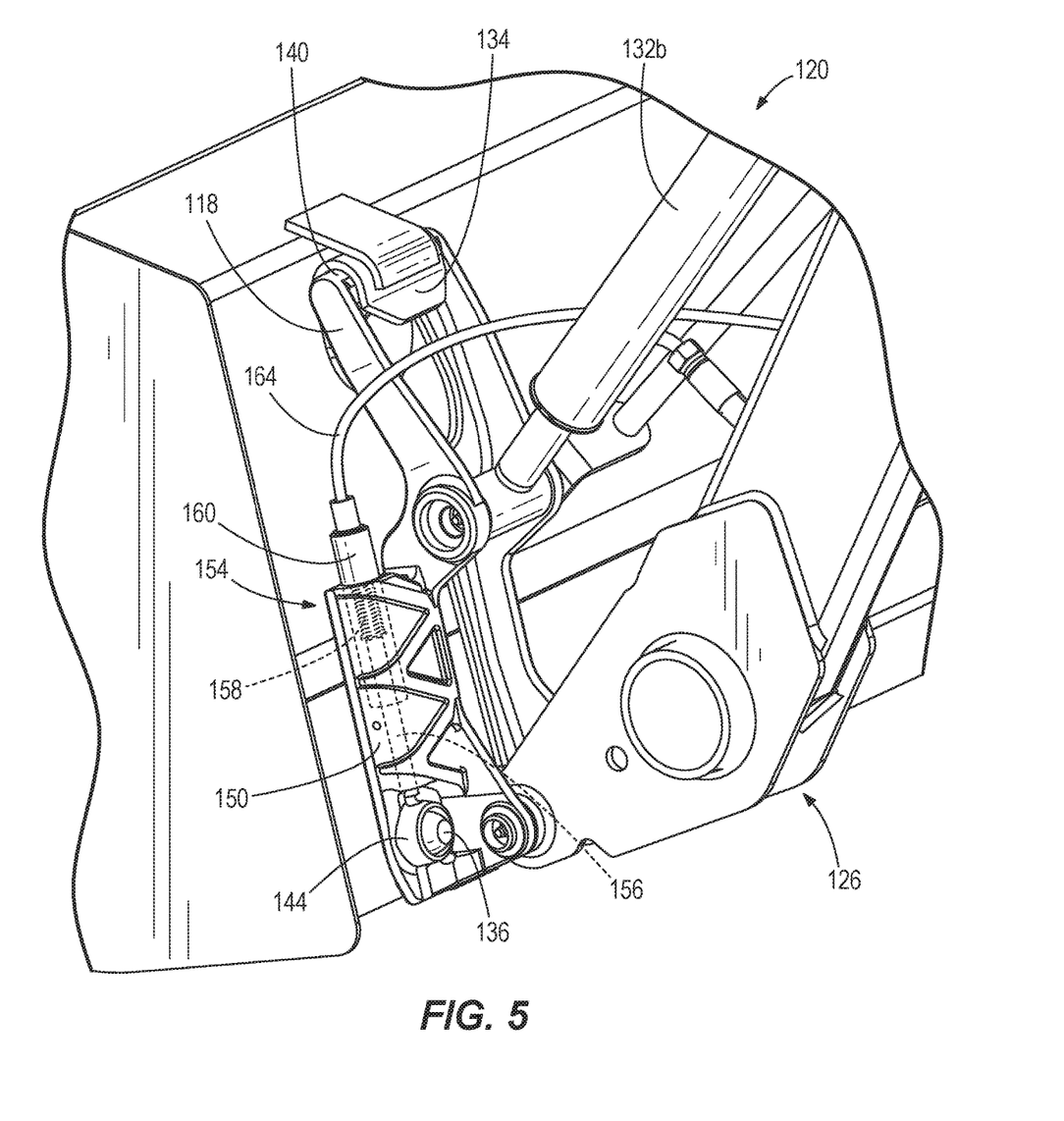
FIG. 5 is a detailed perspective view of a portion of FIG. 3 illustrating the implement attachment member fully engaged with the implement and the lock assembly disengaged from a portion of the implement.
Figure 6:
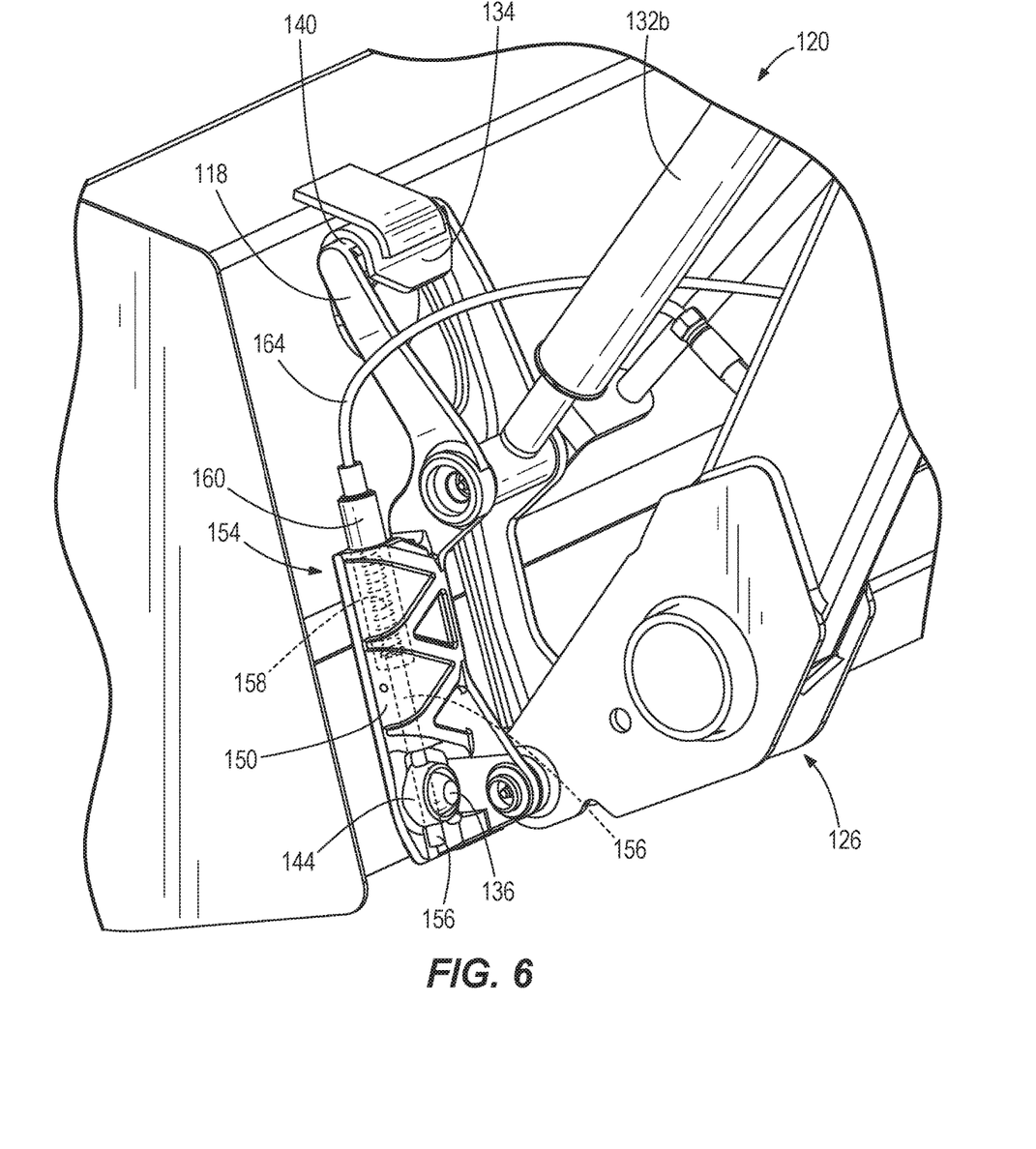
FIG. 6 is the detailed perspective view of FIG. 5 with the lock assembly engaged with the portion of the implement.

With reference to FIGS. 5 and 6, a lock assembly 154 of the connection system 120 is shown. The lock assembly 154 is coupled to the implement attachment bracket 118 and disposed in the elongated passage 148. In some embodiments, more than 50% of the length of the lock assembly 154 is disposed in the elongated passage 148. In some embodiments, the length of the lock assembly 154 also extends parallel to the length of the implement attachment bracket 118.

The lock assembly 154 includes a pin 156. The pin 156 engages the protrusion 136 of the implement 116 by occupying the aperture 138 of the protrusion 136 when the pin 156 is in the engaged position (FIG. 6). Also, a majority of the length of the pin 156 is surrounded by the sleeve 150 of the implement attachment bracket 118 when the pin 156 is in the disengaged position (FIG. 5), while a majority of the length of the pin 156 is not surrounded by the sleeve 150 when the pin 156 is in the engaged position (FIG. 6). The illustrated embodiment includes a resilient member (e.g., a spring) 158 positioned such that the pin 156 is biased toward the engaged position. The resilient member 158 and the pin 156 are illustrated in a concentric relationship. When the pin 156 is in the engaged position, the pin 156 also occupies both of the openings 146 of the cylindrical projection 144 of the implement attachment bracket 118. In this manner, the implement 116 is rigidly and securely connected to the implement attachment bracket 118.

The lock assembly 154 also includes an electrically operated actuator 160. The actuator 160 is coupled to the pin 156 and translates the pin 156 toward the disengaged position. In some embodiments, the actuator 160 also translates the pin 156 toward the engagement position. Stated another way, the actuator 160 activates to linearly move or shift the pin 156 toward at least one of the disengaged position and the engagement position. In embodiments including the resilient member 158, the actuator 160 moves the pin 156 toward the disengaged position against the bias of the resilient member 158. The actuator 160 may be any appropriate electrical actuator that activates when supplied with power including, but not limited to, an electric motor, a solenoid, and the like. The actuator 160 has an outer surface that is at least partially surrounded by the sleeve 150 of the implement attachment bracket 118. In the illustrated embodiment, a majority of the outer surface of the actuator 160 is surrounded by the sleeve 150 of the implement attachment bracket 118. In such embodiments, the sleeve 150 may protect the actuator 160 and/or the pin 156 from impact damage, jamming due to introduction of contaminants such as dirt, and the like.

Figure 7:
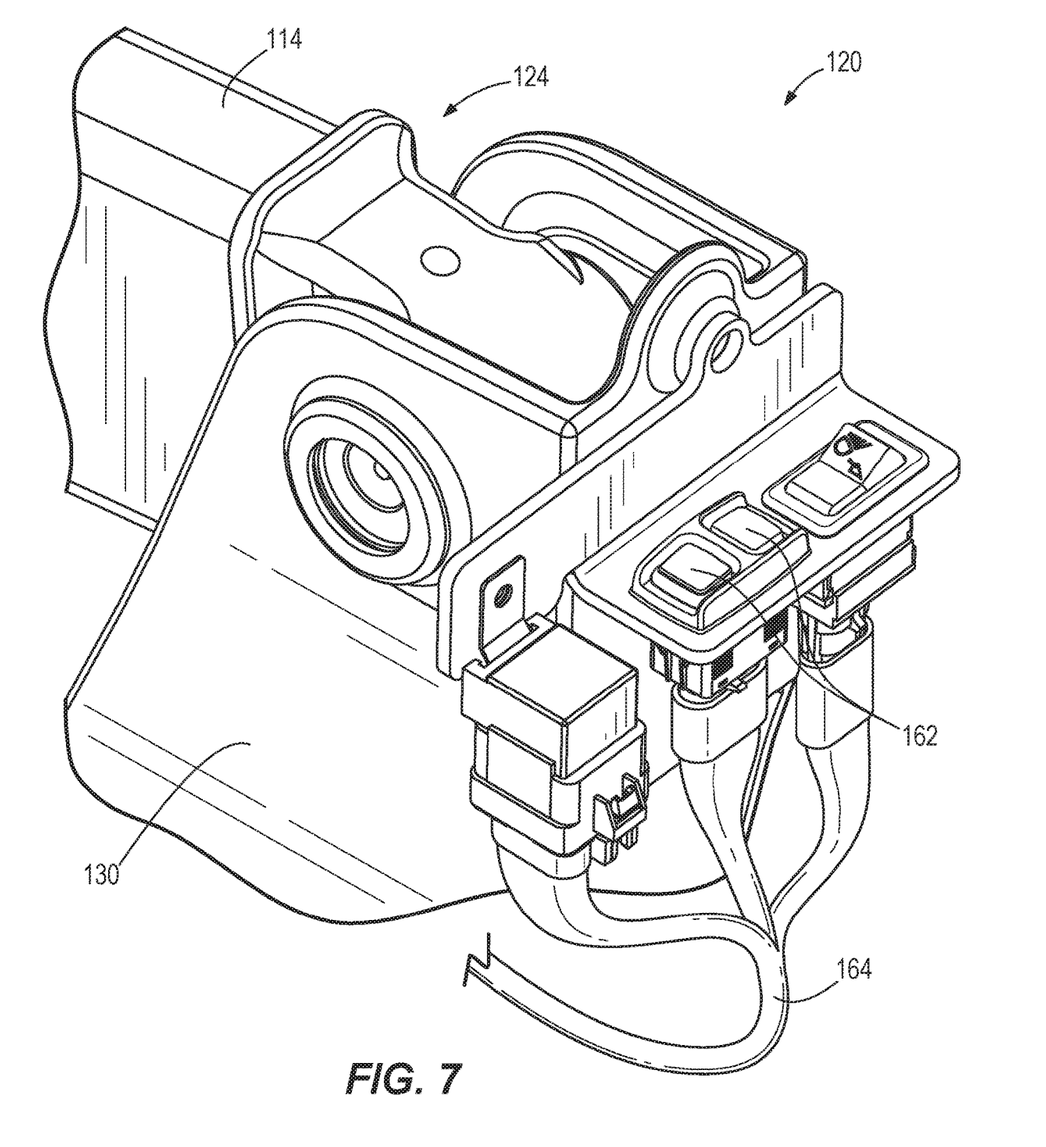
FIG. 7 is a detailed perspective view of a portion of FIG. 3 illustrating a control switch of the connection system.

With reference to FIG. 7, the connection system 120 further includes a control switch 162. The control switch 162 is positioned for engagement by a user from within the operator control area 110. In the illustrated embodiment, the control switch 162 is disposed on the detachable member 130 adjacent the proximal end 124 of the arm 114. Stated another way, the control switch 162 is accessible from the seat 112. The control switch 162 may be positioned adjacent the seat 112 and, more particularly, within four feet of the seat 112. As illustrated in FIG. 7, other controls may also be positioned adjacent the control switch 162. These other controls may include light switches and the like. The control switch 162 selectively places the actuator 160 in electrical communication with the power source 108. The control switch 162 may also be in selective electrical communication with the actuator 160 directly. When the power source 108 is in electrical communication with the actuator 160, the actuator 160 moves the pin 156 toward the disengaged position.

Both the control switch 162 and the power source 108 are illustrated as being in selective electrical communication with the actuator 160 via a wiring harness 164. Due to the size of the illustrated work vehicle 100, the length of the wiring harness 164 in the illustrated embodiment is greater than 1.5 meters (4.92 feet). In some embodiments, the length of the wiring harness 164 is approximately two meters (6.56 feet). In some embodiments, the length of the wiring harness 164 has a maximum of approximately three meters (9.84 feet). In such embodiments, the longest branch of the wiring harness 164 is approximately three meters (9.84 feet) in length and the shorter branch of the wiring harness 164 is approximately two meters (6.56 feet) in length.

In some embodiments, the work vehicle 100 includes first and second lock assemblies 154. Each lock assembly 154 is coupled to a respective arm 114 and includes a respective pin 156 and a respective actuator 160. The second lock assembly is not shown or described in detail herein because it is substantially similar to the lock assembly 154 described above. In the illustrated embodiment, the lock assembly 154 on one side of the work vehicle 100 is a mirror image of the lock assembly 154 on the other side of the work vehicle 100. As shown in FIG. 1 of the illustrated embodiment, the wiring harness 164 includes a Y-shape to reach a lock assembly 154 on each side of the work vehicle 100. The wiring harness 164 includes a splitter 166 to electrically connect the control switch 162 and/or the power source 108 concurrently to both actuators 160 of the connection system 120.

In operation, the implement (such as the illustrated bucket) 116 can be disconnected from the implement attachment bracket 118 on the work vehicle 100. The operator moves the pin 156 of the lock assembly 154 to the disengaged position by actuating the actuator 160 through operation of the control switch 162. Once the pin 156 of the lock assembly 154 is in the disengaged position, the user then positions the implement 116 on the ground and manipulates the implement attachment bracket 118 relative to the arm 114 via actuation of the hydraulic cylinder assembly 132b to pivot the implement attachment bracket 118 relative to the implement 116. The implement attachment bracket 118 pivots relative to the implement 116 about the connection of the bar 140 of the implement attachment bracket 118 to the corresponding hook 134 of the implement 116. This pivot motion removes the protrusion 136 of the implement 116 from the corresponding hole 142 of the implement attachment bracket 118. Thereafter, the operator moves the arm 114 downwardly toward the ground by actuation of the hydraulic cylinder assembly 132a to detach the bar 140 from the hook 134.

To attach another implement (such as another bucket, a hay bale fork, a snow pusher, etc.) 116, the operator aligns the bar 140 of the implement attachment bracket 118 with the hook 134 of the implement 116 by at least one of steering the work vehicle 100 into place via the steering wheel 122 while moving the work vehicle 100 in forward or reverse, rotating the arm 114 relative to the frame 106 by actuation of the hydraulic cylinder assembly 132a, and rotating the implement attachment bracket 118 relative to the arm 114 by actuation of the hydraulic cylinder assembly 132b.

Once the bar 140 of the implement attachment bracket 118 is engaging the corresponding hook 134 of the implement 116, the implement attachment bracket 118 is rotated relative to the implement 116 about the connection between the bar 140 and the hook 134. This rotation may be accomplished by rotating the implement attachment bracket 118 relative to the arm 114, by rotating the arm 114 relative to the frame 106 to thereby lift the implement attachment bracket 118 and the implement 116 such that gravity rotates the implement 116 relative to the implement attachment bracket 118, or both. In any case, the operator manipulates the hydraulic cylinder assemblies 132a, 132b until the protrusion 136 of the implement 116 enters and is fully received in the corresponding hole 142 of the implement attachment bracket 118. In this position, the aperture 138 of the protrusion 136 is aligned with the openings 146 of the cylindrical projection 144 of the implement attachment bracket 118.

Next, the lock assembly 154 is operated to lock the implement 116 to the implement attachment bracket 118. The operator moves the pin 156 of the lock assembly 154 to the engaged position by releasing the actuator 160, thereby allowing the resilient member 158 to move the pin 156, through operation of the control switch 162. The pin 156 then occupies the aperture 138 of the protrusion 138 and the openings 146 of the cylindrical projection 144 of the implement attachment bracket 118.

Although only one arm 114, implement attachment bracket 118, hook 134, protrusion 136, and lock assembly 154 has been described above in the operation of the connection system 120, the present disclosure contemplates embodiments of a work vehicle 100 with two arms 114, implement attachment brackets 118, hooks 134, protrusions 136, and lock assemblies 154. In such embodiments, the two lock assemblies 154 operate in the same manner concurrently during the operations discussed above.

In further embodiments, an indicating mechanism can be coupled to the connection system 120 indicating the unlocked/disengaged position (FIG. 5) and/or the locked/engaged position (FIG. 6) to the operator. In particular, the indicating mechanism monitors when the pin 156 is extended toward the engaged position, providing a locked signal. Additionally or alternatively, the indicating mechanism monitors when the pin 156 is retracted toward the disengaged position, providing an unlocked signal. For example, the indicating mechanism may be an electrical sensor that monitors a position of the pin 156 relative to the actuator 160, monitors the biasing force of the resilient member 158 (e.g., via a pressure switch), monitors a position of the pin 156 relative to the far opening 46 in the cylindrical projection 144 of the implement attachment bracket 118, and the like. Alternatively, the indicating mechanism can monitor relative contact between the pin 156 and the protrusion 136 of the implement 116, which completes an electrical circuit once the pin 156 is received within the aperture 138 or breaks the electrical circuit once the pin 156 is displaced from the aperture 138. The indicating mechanism can be electrically coupled to an indicator member (e.g., LED display) located within the operator control area 110.

The invention claimed is:

1. A connection system for connecting an implement to a work vehicle having a movable arm and an operator control area, the connection system comprising:
   a lock assembly configured to be coupled to the movable arm, the lock assembly including
      a pin configured to engage a portion of the implement, the pin configured to translate from a disengaged position to an engaged position;
      a spring directly engaging the pin, the spring biasing the pin toward the engaged position; and
      an electromagnetic actuator configured to directly engage with the pin for translating the pin;
   a control switch positioned for engagement from within the operator control area, the control switch configured to be in selective electrical communication with the electromagnetic actuator; and
   wherein activation of the control switch causes the electromagnetic actuator to translate the pin toward the disengaged position.

2. The connection system of claim 1, wherein the electromagnetic actuator includes a solenoid.

3. The connection system of claim 1, further comprising an implement attachment member configured to be pivotally connected to the movable arm; and
   wherein the lock assembly is coupled to the implement attachment member.

4. The connection system of claim 3, wherein
   the implement attachment member includes an elongated passage; and
   the lock assembly is disposed in the elongated passage.

5. The connection system of claim 4, wherein greater than 50% of a length of the lock assembly is disposed in the elongated passage.

6. The connection system of claim 4, wherein the implement attachment member includes a sleeve defining the elongated passage.

7. The connection system of claim 4, wherein the elongated passage is a cylindrical passage.

8. The connection system of claim 4, wherein
   the implement attachment member includes an implement protrusion receiving hole; and
   the elongated passage extends orthogonally to the implement protrusion receiving hole.

9. The connection system of claim 1, further comprising a wiring harness placing the switch in electrical communication with the electromagnetic actuator, the wiring harness being greater than 1.5 meters long.

10. The connection system of claim 9, wherein
   the lock assembly is a first lock assembly configured to be coupled to a first movable arm, the pin is a first pin configured to engage a first portion of the implement, and the electromagnetic actuator is a first electromagnetic actuator;
   the connection system further comprises a second lock assembly configured to be coupled to the movable arm, the second lock assembly including
      a second pin configured to engage a second portion of the implement; and
      a second electromagnetic actuator directly engageable with the second pin for translating the second pin; and
   the wiring harness places the switch in electrical communication with both the first electromagnetic actuator and the second electromagnetic actuator.

11. A work vehicle to removably couple an implement thereto, the work vehicle comprising:
   a frame;
   a power source coupled to the frame;
   a seat coupled to the frame;
   an arm movable relative to the seat and including a proximal end and a distal end, the proximal end of the arm coupled to the frame;
   an implement attachment bracket coupled to the distal end of the arm, the implement attachment bracket configured to removably receive a portion of the implement;
   a lock assembly coupled to the implement attachment bracket, the lock assembly including
      an electromagnetic actuator disposed on the implement attachment bracket;
      a pin configured to translatably engage with the electromagnetic actuator, the pin configured to engage the portion of the implement, the pin configured to move between an engaged position and a disengaged position; and
      a spring directly engaging the pin, the spring biasing the pin toward the engaged position;
   a switch accessible from the seat, the switch configured to place the electromagnetic actuator in electrical communication with the power source; and
   wherein the electromagnetic actuator is configured to move the pin toward the disengaged position against the spring.

12. The work vehicle of claim 11, wherein
   the implement attachment bracket includes a length extending in a longitudinal direction; and
   the lock assembly includes a length extending parallel to the longitudinal direction.

13. The work vehicle of claim 11, wherein the switch is coupled to the arm and positioned adjacent the seat.

14. The work vehicle of claim 13, wherein the switch is disposed within 4 feet of the seat.

15. The work vehicle of claim 11, wherein
   the implement attachment bracket includes a cylindrical projection configured to at least partially surround the portion of the implement; and
   the cylindrical projection includes two aligned openings, both openings configured to receive the pin in the engaged position.

16. The work vehicle of claim 11, wherein electrical communication between the power source and the electromagnetic actuator moves the pin toward the disengaged position.

17. The work vehicle of claim 11, wherein
   the electromagnetic actuator includes an outer surface; and
   the implement attachment bracket surrounds a majority of the outer surface of the electromagnetic actuator.

18. The work vehicle of claim 17, wherein
   the implement attachment bracket includes a port defined therein; and
   in the engaged position, the pin extends through the port and a majority of a length of the pin is no longer surrounded by the implement attachment bracket.

* * * * *